INVENTORS:
CORNELIS BEZEMER
PETRUS J. DE WAAL
BY: A. H. McCarthy
THEIR AGENT

United States Patent Office 3,409,125
Patented Nov. 5, 1968

3,409,125
APPARATUS FOR SIEVING SUSPENSIONS
Cornelis Bezemer and Petrus J. de Waal, Rijswijk, Netherlands, assignors to Shell Oil Company, New York, N.Y., a corporation of Delaware
Filed Oct. 18, 1965, Ser. No. 496,998
Claims priority, application Great Britain, Oct. 21, 1964, 43,031/64
6 Claims. (Cl. 209—2)

ABSTRACT OF THE DISCLOSURE

Apparatus for sieving from a suspension containing particles of various sizes which flows under pressure along one side of a permeable wall, a second suspension consisting only of particles of relatively small size suspended in a liquid, by creating an alternating pressure difference along said wall, whereby the second suspension is collected in a space at the other side of the wall and drained from said space.

---

Figure 1:
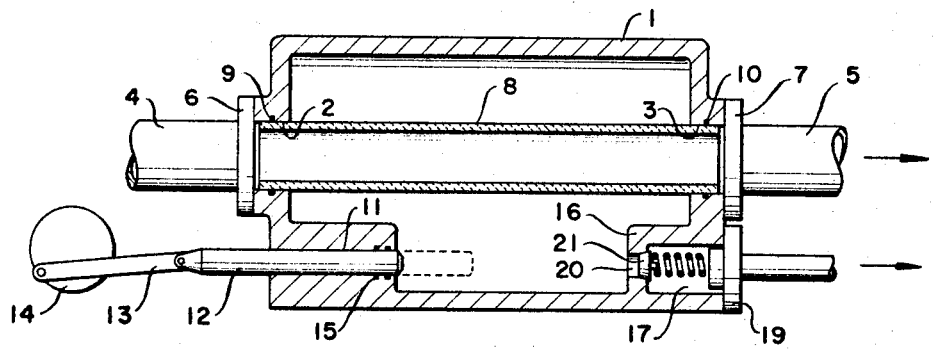

The present invention relates to apparatus for sieving from a suspension containing particles of various sizes, a second suspension comprising only particles of relatively small size.

In particular the present invention can be applied for conditioning drilling mud which is used when drilling holes in subsurface formations. Such drilling mud is circulated through the hole which is being drilled, during which circulation the mud continuously picks up drilling flour produced by the drilling process. When this flour contains clay minerals, the mud rapidly grows too viscous and has to be conditioned regularly.

Such conditioning aimed at the removal of the clay mineral particles, which are of relatively small size with respect to the other particles present in the mud, can, for example, take place by diluting the mud with water, or another liquid which forms a base for the mud, until the desired viscosity has been reached, and discarding the surplus of volume thus obtained. But in this way particles of relatively large size are discarded together with particles of relatively small size. If the particles having a relatively large size are of a valuable nature, mud quality control by dilution is rather uneconomic.

One object of the invention is a simple and economic apparatus for sieving from a suspension containing particles of various sizes, a second suspension containing particles of relatively small size only. These latter particles are hereinafter also called "fines."

Another object of the invention is to provide an apparatus in which such sieving can be carried out, which is of a simple, lightweight construction, and easy to operate.

A further object of the invention is to provide a means for conditioning drilling mud used in a formation drilling process.

In accordance with the invention, in apparatus for sieving from a suspension containing particles of various sizes, a second suspension consisting only of particles of relatively small size suspended in a liquid, the first suspension flows along one side of a permeable wall, an alternating pressure difference is created across the wall, the second suspension is collected in a space at the other side of the wall, and the latter suspension is drained from the space.

The frequency of the alternating pressure difference is at least one cycle per second, and preferably at least 10 cycles per second.

The apparatus for separating from a suspension containing particles of various sizes, a second suspension comprising only particles of relatively small size, comprises a permeable wall forming a separation between a passage for a flow of the first suspension, and a space for receiving the second suspension, means for supplying the first suspension to the said passage, means for creating an alternating pressure difference across the permeable wall, and means for draining the second suspension from the space.

Figure 2:
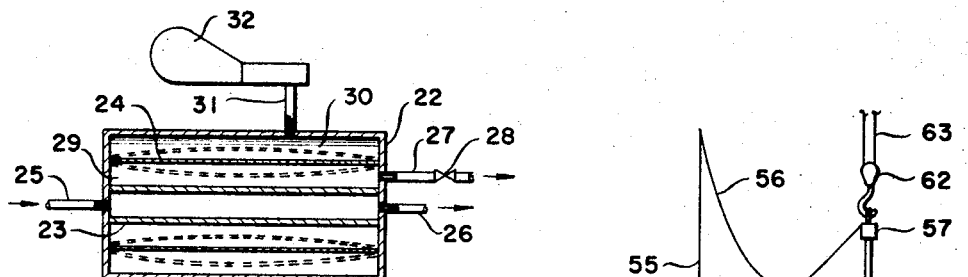
Figure 4:
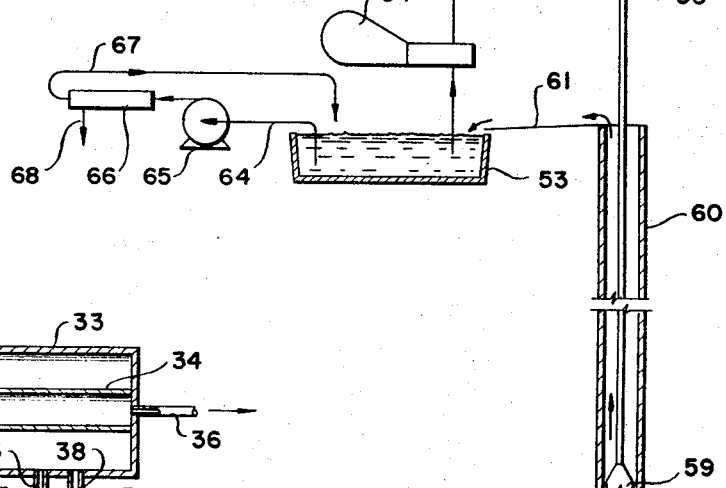
Figure 3:
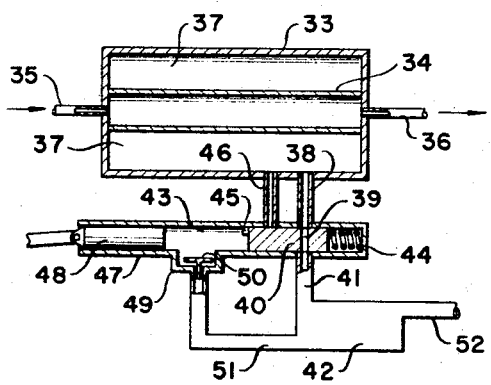

The invention may be carried into practice in various ways but certain embodiments will now be described by way of example with reference to the accompanying drawings in which:

FIGURE 1 shows schematically a vertical cross-section of an apparatus according to the present invention for sieving fines from a suspension of particles;

FIGURES 2 and 3 each show in a very schematic way a vertical cross-section of an apparatus according to the present invention, which in its constructional details differs somewhat from the apparatus shown in FIGURE 1; and, FIGURE 4 shows schematically how the apparatus according to the invention can be used in a system for conditioning drilling mud used in a method of drilling a hole in an underground formation.

The apparatus shown in FIGURE 1 consists of a housing 1 provided in the wall thereof with two opposed openings 2 and 3 which respectively communicate with conduits 4 and 5 which are connected to the housing by means of flanges 6, 7 and suitable connecting means (not shown).

A tubular member 8 is mounted with its ends in the openings 2 and 3, and is sealed with respect to the walls thereof by means of O-rings 9, 10 or other suitable sealing members.

The tubular member 8 has a permeable wall and may for example be manufactured by filling a mold having an annular form with grains or particles of a suitable material, such as bronze or sand. The bronze grains may be consolidated to a firm tubular member by a sintering process. When sand is used as the base material for the tubular member, the sand particles may be bonded together by means of a resin. A number of other materials are known which are suitable to act as a base material for a permeable wall. Since such materials, as well as the method for manufacturing permeable walls therefrom, are known per se, they do not form part of the present invention.

Further, the invention is not limited to the form of the permeable wall as given in the examples. Although the circular cylindrical form as shown in FIGURE 1 is preferred, it may have many other forms, either cylindrical, or in the form of a flat plane. In this latter case the wall is to be arranged in the housing in such a way that the housing is separated into two spaces.

In the wall of the housing 1 below the tubular member 8 is a cylinder 11 in which a plunger 12 is slidably arranged. The driving mechanism from which the plunger 12 may derive its reciprocating movement within the cylinder 11 is formed by a connecting rod 13 and a schematically indicated crank mechanism 14. For the sake of simplicity the driving motor as well as the necessary reducing gears for driving the crank mechanism 14 have been omitted from the drawing. Suitable sealing means 15 (such as O-rings) are arranged to prevent leakage between the wall of the cylinder 11 and the surface of the plunger 12.

In an alternative arrangement the plunger 12 may be replaced by a piston, which has the advantage of a greater diameter-stroke ratio than the plunger, so that the desired pressure oscillations can be generated at very high frequencies, such as 1000 cycles per minute.

The housing 1 is further provided with a valve housing 16 which communicates via an outlet opening 17 with a conduit 18 which is fixed to the housing 1 by means of a flange 19 and suitable connecting members (not shown).

The communication between the valve housing 16 and the interior of the housing 1 is formed by an opening 20 cooperating with a member which periodically opens and closes the passage through this opening, e.g., a spring-biased non-return valve 21 (as shown) or a valve (not shown) controlled by the displacement of the piston 12.

In operation, a suspension consisting of a liquid in which particles of various sizes are suspended, is passed through the inner space of the tubular member 8, which can be effected by supplying the suspension under a substantially constant pressure either via the conduit 4 and draining it via the conduit 5, or by supplying it via the conduit 5 and draining it via the conduit 4.

If the plunger 12 is not operated, the suspension will be forced by the existing pressure difference through the permeable wall 8, whereby the particles or relatively great size will be filtered off and collect on the inner surface of the permeable wall. A suspension consisting of liquid with particles of relatively small size will pass through the permeable member 8 and into the space outside the member 8. This latter suspension may be drained from the space outside the member 8 via a drainvalve (not shown) arranged in the wall of the housing 1.

The particles which are too great to pass through the permeable member 8 are deposited on the inner wall of this member, thus bridging the passages therethrough and building a cake which comprises the whole range of sizes of the particles present in the suspension supplied, and consequently preventing the passage of the relatively small-sized particles through the permeable wall. Consequently, the fluid passing through the permeable wall of the tubular member, which fluid initially consisted of a suspension of relatively small-sized particles in a liquid, soon changes into a clear liquid.

If, however the plunger 12 is activated (and the drainvalve is closed), the pressure within the space outside the tubular member 8 increases to a value higher than the pressure within the member 8, as a result of the volume reduction of this space during the inward stroke of the piston 12 with respect to the housing 1. This causes a backflow of suspension from the space outside the tubular member 8 to the interior thereof, thus removing the cake which has been deposited on the inner wall of the tubular member 8. The cake is disintegrated and carried away by the flow of fluid passing through the tubular member 8.

Since the valve 21 should be open during part of the inward stroke of the piston so as to remove suspension containing fines from the housing 1, the spring of the valve is set so that the valve opens at a pressure slightly above the pressure prevailing within the member 8. The fines-containing suspension which is ejected out of the housing 1 is led away via the conduit 18. During the subsequent outward stroke of the piston 12, the valve 21 is in the closed position, and a new charge of suspension consisting of relatively small-sized particles is drawn out of the tubular member 8 into the space of housing 1. The filter cake which will consequently be deposited on the interior wall of the permeable tubular member is removed subsequently by the inward stroke of the piston, which at the same time ejects a charge of the suspension of fines out of housing 1 via the valve 21 and the conduit 18.

The action of the piston 12 thus creates an alternating pressure difference across the wall 8, and the frequency at which this occurs has to be chosen in relation to the rate at which a cake is formed on the permeable wall of the member 8, which depends inter alia on the flow conditions of the suspension through the tubular member 8, the pore size of the member 8, the particle size distribution of the suspension, the concentration of the particles in the solution, and the value of the pressure differences across the permeable wall. Preferably, the frequency is adjustable by varying the speed of the motor (not shown) driving the crank mechanism 14. The frequency is preferably so chosen that the filter cake is washed back as soon as it has grown to such a thickness that it prevents the relatively small-sized particles from passing through it. Preferably, the tension of the spring acting on the non-return valve 21 is controllable so that the amount of fluid used to backwash the filter cake can be adjusted to the minimum required value.

FIGURE 2 shows schematically an alternative arrangement including a housing 22 in which the tubular member 23 having a permeable wall is surrounded by a tubular membrane 24. The suspension to be treated is passed via a conduit 25 into the member 23 and drained from the housing via a conduit 26. A drain conduit 27 in which a non-return valve 28 is arranged communicates with the annular space 29 between the permeable tubular member 23 and the tubular membrane 24.

Communicating via a conduit 31 with the space 30 outside the membrane 24 and within the housing 22 is the cylinder space of a pump 32 of the reciprocating type. As the cylinder space of the pump 32 only communicates with the space 30 and is not provided with inlet and outlet valves, the movements of the piston of pump 32 will result in an alternating increase and decrease of the volume of the space 29 arranged between the membrane 24 and the member 23.

The suspension to be treated is passed through the permeable tubular member 23 and by the periodic change of the volume of space 29 (wide broken lines which indicate extreme positions of membrane 24), the pressure within space 29 is periodically varied, as a result of which part of the suspension containing fines will be displaced from the space 29 during the intervals in which the pressure in the space 29 is higher than the pressure inside the permeable member 23. Part of this displaced suspension is used to backwash the permeable member 23, thereby removing the filter layer formed on the inner wall of this member, while the other part of this suspension is ejected out of the space 29 via the conduit 27 and the valve 28. Since the volume of suspension used to backwash the permeable member 23 is considerably smaller than the volume of suspension which has built up the cake during its passage through the member, there is a net flow of this suspension through the permeable member in the direction of the space 29.

In another way, the pump for creating the alternating pressure difference across the permeable wall may be provided with a separate circuit as shown in FIGURES 3. In this case a housing 33 contains a permeable wall 34 (e.g., in the form of a conduit having a circular cross-section) and is provided with conduits 35 and 36 communicating with the space inside the wall 34 so as to supply fluid thereto and drain fluid therefrom, respectively. The space 37 outside the wall 34 but within the housing 33 communicates with a drain conduit 38 which communicates via an opening 39 in a valve 40 with a conduit 41 debouching into a reservoir 42. The valve 40 is slidably arranged within a valve housing 43 and cooperates at one side thereof with a spring 44 and at the other side in its extremely left position with a stop member 45. In the extreme left-hand position of the valve 40, the entrance to a conduit 46 leading from a interior of the valve housing 43 to the space 37 is closed, and the opening 39 is in alignment with the conduits 38 and 41, whereby a free passage is provided between the space 37 and the reservoir 42. The valve housing 43 further comprises a cylinder 47 having a piston 48 slidably arranged for reciprocation therein, and a suction valve housing 49 comprising a suction valve 50, the housing 49 communicating via a conduit 51 with the reservoir 42. The piston 48 is actuated by a suitable driving mechanism which is only schematically indicated. A conduit 52 communicates with the reservoir 42 for draining the suspension containing fines therefrom.

The operation of the sieve apparatus according to FIGURE 3 is as follows.

A suspension containing particles of various sizes is passed into the permeable member 34 via the conduit 35 and led away therefrom via the conduit 36. The pressure in the space 37 is periodically raised by injecting a liquid into this space by means of the piston 48 which is operated at a desired frequency. Preferably the piston 48 has an adjustable stroke. The liquid is sucked from the reservoir 42 via the conduit 51 and the suction valve 50 at each suction stroke of the piston 48, and injected into the space 37 via the conduit 46 on each subsequent pressure stroke of the piston 48, which raises the pressure in the cylinder 47 and the valve housing 43, thereby displacing the valve 40 to the right against the action of the spring 44. Displacement of valve 40 to the right opens the entrance to the conduit 46 and closes the communication between the conduits 38 and 41. These two actions may take place simultaneously. Consequently, the amount of liquid injected into the space 37 displaces an equal amount of liquid through the permeable wall 34 into the inner space thereof, thereby backwashing this permeable wall and removing any cake which has been deposited on the inner side thereof. The alternating pressure difference which is thus created across the permeable wall 34 by the pump action results in the following actions.

During the intervals in which the pressure within the space 37 is lower than the pressure within the member 34, suspension is passed out of the member 34 into the space 37. Only relatively small-sized particles can pass through the permeable wall of member 34, while the relatively large-sized particles are caught on the surface of the inner wall of the member 34, thus forming a cake which obstructs the passage through the pore space of the wall 34. The suspension containing relatively small-sized particles is passed through the space 37, the conduit 38, the opening 39 in the valve 40, and the conduit 41 to the reservoir 42, from which it is drained for the greater part via the conduit 52. A small part of this suspension is, however, recirculated to the space 37 by the action of the pump consisting of the piston 48, the cylinder 47, the suction valve 50 and the pressure valve 40, thereby creating intervals during which the pressure within the space 37 is higher than the pressure prevailing within the inner space of the permeable member 34. During these intervals the filter cake formed on the inner wall of the member 34, which cake prevents the passage of relatively small-sized particles, is disintegrated and carried away by the suspension flow passing in an axial direction through the member 34. Since the quantity of fluid required to backwash the member 34 is smaller than the quantity of fluid which has passed through the member 34 before the cake which is being deposited thereon during this passage has grown to such a thickness that it prevents the passage of relatively small-sized particles, there remains a net flow of fluid consisting of a suspension comprising relatively small-sized particles out of the drain conduit 52.

A particular application of the method and apparatus according to the invention will be described with reference to FIGURE 4 of the drawing in which the invention is applied for removing fines from a drilling mud which is used in a deep well drilling process. To such mud there have been added various substances, all of which fulfill their own function. Thus clay, such as bentonite, is used for plastering the walls of the borehole to prevent the loss of drilling fluid into the formation pore space. Another additive may be barite, which is used to weight the drilling fluid to prevent undesirable blow-out of the wells or caving in thereof. During the drilling, the amount of clay will increase as clay particles are loosened from the formation by drilling process and become suspended in the drilling mud. The increase in the clay content of the mud results in an undesirable increase in the viscosity thereof.

One way to combat such viscosity increase is to dilute the drilling mud with water and discard the surplus amount of fluid thus obtained. If, however, barite has been added to the drilling mud in a suspended form, part thereof is discarded together with the undesired amount of clay, which makes this method, in view of the price of barite, rather uneconomic. The amount of barite to be thrown away when conditioning drilling mud can be reduced by applying the method and apparatus according to the present invention. In FIGURE 4 there is schematically shown a drilling mud circulation system comprising a mud pit 53 from which the mud is sucked by a mud pump 54, which forces it via a conduit 55, a flexible hose 56, a swivel 57, a drill string 58 and a bit 59 to the bottom of the borehole 60, from which it returns in upward direction through the annular space situated between the drill string 58 and the borehole wall 60 to the top of the well, from which it is guided via a mud ditch 61 to the mud pit 53.

The drill string 58 is carried by a block 62 provided with a hook, which block is suspended by a cable 63 from a derrick (not shown).

A second mud circuit in which the mud pit 53 is incorporated comprises a suction line 64, a pump 65, an apparatus 66 according to FIGURE 1, FIGURE 2, FIGURE 3, or an alternative construction according to the invention, and a return conduit 67.

The drilling mud which is circulated through the circuit comprising the mud pump 54 continuously picks up clay particles from the bottom of the hole 60, which results in a thickening of the mud. When the viscosity of the mud tends to become too high for normal operation, the pump 65, which is preferably a constant pressure pump, or a pump provided with a means for dampening pressure variations, is started and drilling mud is sucked from the mud pit 53 and passed through the apparatus 66. In this apparatus the mud flow is separated into two streams as described already in connection with FIGURES 1 to 3, wherein a suspension containing only relatively small-sized particles is separated from the main flow. The main flow of mud is returned to the mud pit 53 via a conduit 67, while the suspension containing only relatively small-sized particles is ejected via a conduit 68 (corresponding to conduits 18, 27 and 52 in FIGURES 1, 2 and 3, respectively). Together with the undesired amount of clay, water as well as mud additives such as barite, are removed from the mud. To keep the volume of mud as well as its properties constant, water and the required additives have to be added to make up for the water and additives discarded together with the clay particles. This addition is suitably carried out in the mud pit 53, which may be provided with suitable mixing means (not shown in the drawing).

Since the separation in the apparatus 66 takes place according to size, and the mean size of the barite particles is greater than the mean size of the clay particles, the barite/clay ratio in the suspension separated from the mud is smaller than the barite/clay ratio in the drilling mud. The clay particles are thus preferably sieved from the mud, and as a consequence the conditioning of the drilling mud by using the present invention is considerably cheaper than the above-described method in which the mud is diluted and the surplus volume thus obtained is discarded.

The conditioning of mud, as shown in FIGURE 4, can be carried out either continuously or discontinuously. Particularly when applying the continuous method, the dimensions of the pump 65, the driving motor thereof (not shown) and the apparatus 66 can be kept very small.

In another way, the apparatus according to the invention can be incorporated directly in the main drilling mud circuit, instead of in a separate circuit. In this manner, use can be made, e.g., of the apparatus as shown in FIGURE 1 wherein the conduit 4 (FIGURE 1) is connected to the outlet of the pump 54 (FIGURE 4) and the conduit 5 (FIGURE 1) is connected to the flexible hose 56 (FIGURE 4). The cylinder 11 and the piston 12 (FIGURE 1) are omitted, and the desired pressure differences across the permeable wall 8 are formed by the pressure pulsations of the mud flow emerging from the mud pump 54, which now has to be of the reciprocating type.

If desired, a number of apparatuses according to the invention may be used for treating a suspension flow, wherein the apparatuses may be arranged either in parallel or in series with respect to the flow. The permeable walls 8, 23 or 34 may be mounted in separate housings 1, 22 or 33, respectively, or in a single housing. When using the apparatus according to FIGURE 1, a single piston 12 will in the latter case be sufficient to create the desired pressure pulsations.

As already indicated hereinbefore, the frequency of the alternating pressure difference across the permeable wall depends on the rate at which the cake is formed on the permeable wall. This frequency will be at least one cycle per second, and preferably above 10 cycles per second.

It will be understood that the present invention is not limited to the methods and apparatuses which have been described in connection with FIGURES 1, 2, 3 and 4 as shown in the drawings, since many modifications may be made.

We claim as our invention:

1. Apparatus for separating from a first suspension containing particles of various sizes, a second suspension comprising only particles of relatively small size, said apparatus comprising:
    (a) a housing having inlet means and outlet means;
    (b) pump means for introducing said first suspension under substantially constant pressure into said inlet means;
    (c) a permeable wall mounted within said housing and defining a passage for the continuous flow of said first suspension between said inlet means and said outlet means whereby said first suspension is maintained under said substantially constant pressure as it passes through the housing, said substantially constant pressure being greater than the head pressure of said first suspension as it flows along one side of said permeable wall within said housing;
    (d) a space within said housing on the other side of said permeable wall;
    (e) means for creating an alternating pressure difference across said other side of said permeable wall within said space with the minimum applied pressure being less than said substantially constant pressure and the maximum applied pressure being greater than said substantially constant pressure, said second suspension separating from said first suspension and passing through said permeable wall into said space when said applied pressure is less than said substantially constant pressure; and
    (f) drain valve means operably associated with said space and responsive to actuation of said means for creating an alternating pressure difference to drain said second suspension from said space.

2. Apparatus according to claim 1 wherein said first suspension is drilling mud which is pumped from a mud suspension associated with a drilling mud circulation system by said pump means and returned to said mud pit after said second suspension has been separated therefrom.

3. Apparatus according to claim 1 wherein said means for creating an alternating pressure difference is a reciprocating pump and said space communicates with the outlet of said pump and said drain valve means opens and closes in response to the reciprocating action of said reciprocating pump.

4. Apparatus according to claim 1 wherein said permeable wall is of cylindrical shape and surrounds said inlet means and said outlet means within said housing to define said passage for said first suspension and wherein said space for receiving the second suspension lies outside the cylindrical permeable wall.

5. Apparatus according to claim 1, wherein the permeable wall is formed of a mass of solid grains consolidated together.

6. Apparatus according to claim 4, wherein at least two cylindrical permeable walls are used.

References Cited

UNITED STATES PATENTS

| | | | |
|---|---|---|---|
| 361,107 | 4/1887 | Wood | 209—273 |
| 488,166 | 12/1892 | Flanders | 209—273 |
| 581,498 | 4/1897 | Wallberg | 209—273 |
| 834,192 | 10/1906 | Chapman | 209—357 X |
| 1,124,802 | 1/1915 | Qviller | 209—300 X |
| 1,452,151 | 4/1923 | Genter | 210—19 |
| 2,338,418 | 1/1944 | Forrest | 210—412 |
| 2,627,979 | 2/1953 | Lamb | 210—412 |
| 2,724,508 | 11/1955 | Luther | 210—19 X |
| 2,941,783 | 6/1960 | Stinson | 209—211 X |
| 3,002,915 | 10/1961 | Rotder | 210—19 X |

FOREIGN PATENTS 157,627  12/1939  Austria.

HARRY B. THORNTON, *Primary Examiner.*

ROBERT HALPER, *Assistant Examiner.*